United States Patent [19]

Chee

[11] Patent Number: 4,860,525

[45] Date of Patent: Aug. 29, 1989

[54] ROTARY CUTTING MACHINES AND COMPONENTS THEREFOR

[76] Inventor: Seck W. Chee, 25 Jalan Unggas, Singapore, Singapore

[21] Appl. No.: 148,551

[22] Filed: Jan. 26, 1988

Related U.S. Application Data

[62] Division of Ser. No. 802,191, Nov. 25, 1985, Pat. No. 4,736,573.

[30] Foreign Application Priority Data

Nov. 28, 1984 [GB] United Kingdom ................ 8429954
Jun. 11, 1985 [GB] United Kingdom ................ 8514667
Jul. 3, 1985 [GB] United Kingdom ................ 8516793

[51] Int. Cl.$^4$ ............................................. A01D 34/73
[52] U.S. Cl. ........................................ 56/12.7; 56/295; 30/276
[58] Field of Search ................ 56/136, 295, 17.5, 255, 56/12.7; 30/276, 347, 349, 351

[56] References Cited

U.S. PATENT DOCUMENTS

| | | | |
|---|---|---|---|
| 2,115,265 | 4/1938 | Jennett | 56/295 |
| 2,529,797 | 11/1950 | Cauble | 56/295 |
| 2,529,870 | 11/1950 | Golasky | 56/295 |
| 2,697,323 | 12/1954 | Horn | 52/12.7 |
| 4,715,173 | 12/1987 | Anderson | 56/295 |

FOREIGN PATENT DOCUMENTS

| | | | |
|---|---|---|---|
| 2245183 | 3/1973 | Fed. Rep. of Germany | 56/295 |
| 2352238 | 4/1975 | Fed. Rep. of Germany | 56/295 |

*Primary Examiner*—John Weiss
*Attorney, Agent, or Firm*—Scrivener and Clarke

[57] ABSTRACT

Improved guard and blade assemblies for a rotary cutting machine; wherein the guard has a full rear skirt, and an apertured front skirt of three designs of guard element mounted in cantilever; and wherein the cutter blade is of the swivel type but with retention means for the cutter blade designed to warn the operator of swivel blade pivot failure and with the blade being replaceable without need to disassemble the cutter head; the cutter blade has apertures for adjustable weighting of the swivel blade to provide a variable moment arm; an improved design of replaceable blade tip is also proposed for propeller-type and swivel-type blades.

8 Claims, 7 Drawing Sheets

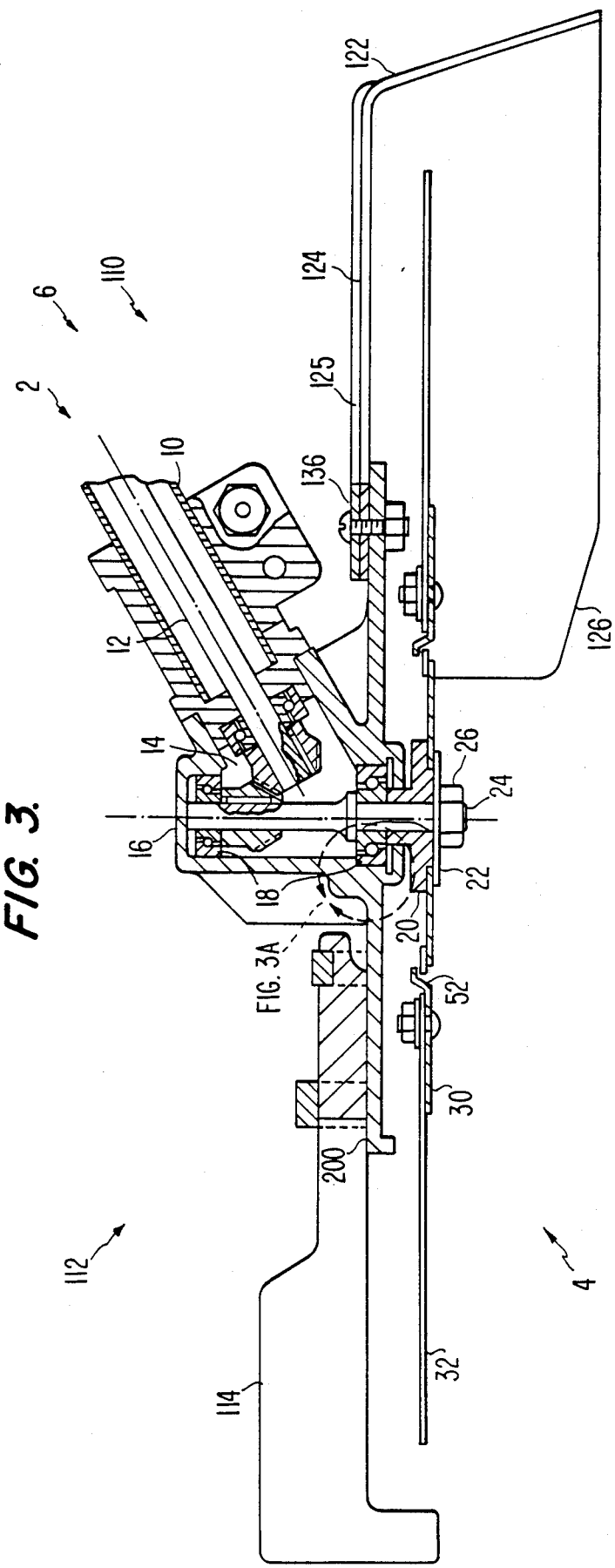
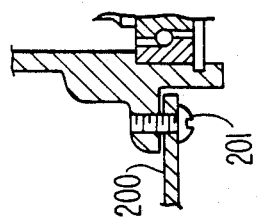
FIG. 3
FIG. 3A.

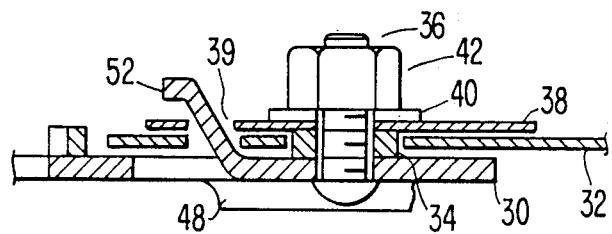
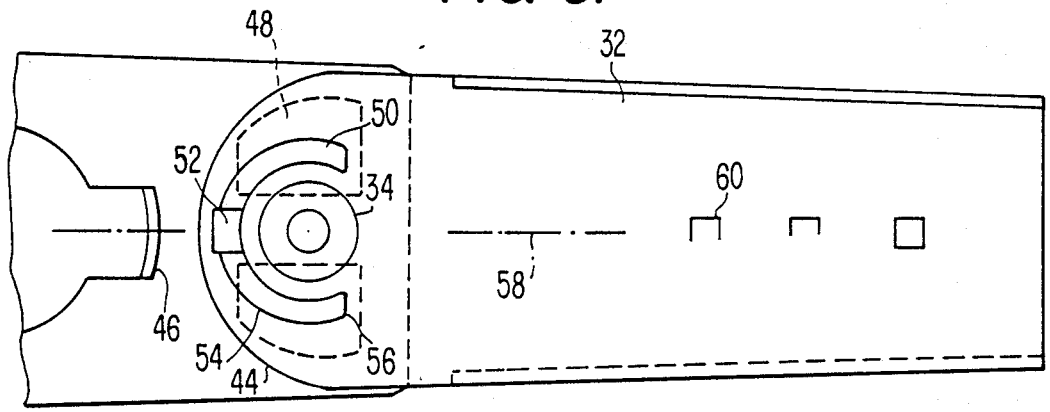
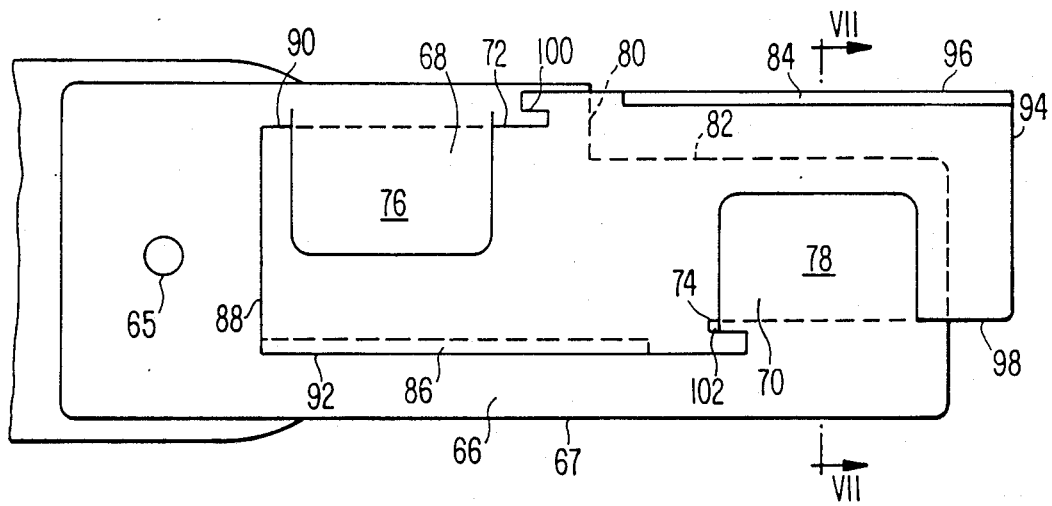
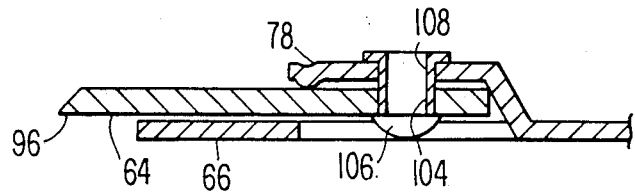

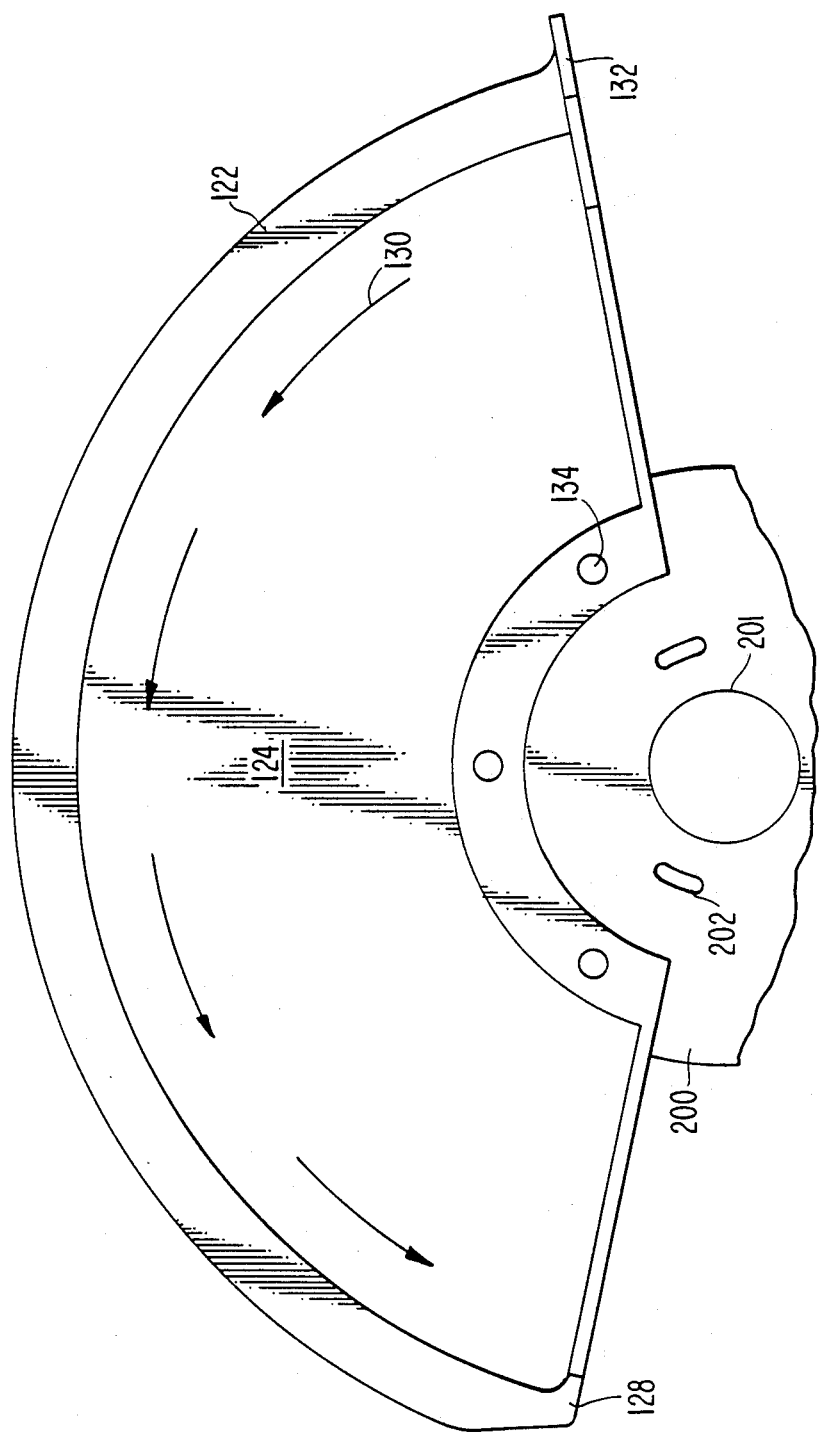

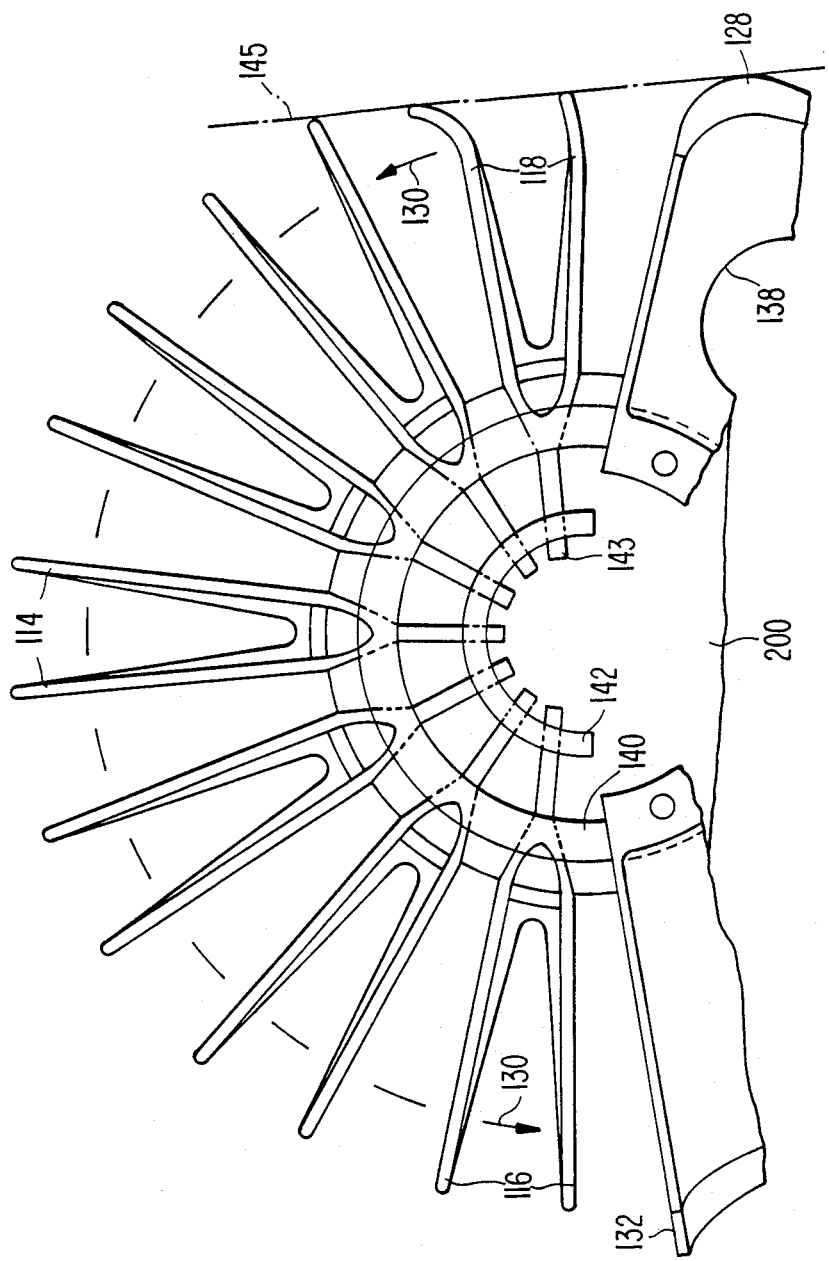

ROTARY CUTTING MACHINES AND COMPONENTS THEREFOR

This is a division, of application Ser. No. 802,191, filed Nov. 25, 1985 now U.S. Pat. No. 4,736,573.

TECHNICAL FIELD

This invention relates to rotary cutting machines, and in particular to rotary cutting machines and components therefor such as a cutter blade and a guard. Rotary cutting machines can be categorised as being of the airlift type with the orbiting cutter blade also creating an air cushion on which the machine is supported above the vegetation to be cut, or as being of the non-airlift type such as the manually-supported strimmers usually carried on the operator's shoulder, and the conventional ground-supported skid or wheeled machines.

BACKGROUND OF THE INVENTION

It has long been recognised that rotary cutting machines present considerable safety hazards to both the operator and to bystanders. The cutter blade will often orbit at rotational speeds in excess of 4,500 rpm and objects impacted by the blade can be thrown outwards with considerable energy or the blade may fracture as a result of metal fatigue and itself become a dangerous missile.

There have been a large number of prior proposals seeking to minimise these dangers. But many, such as that of U.S. Pat. No. 3,971,199 for a non-airlift wheel-mounted machine enclose the cutter blade in a manner adversely affecting cutting efficiency. Safety proposals which seriously impair the cutting efficiency of the mower find only limited user acceptance. U.S. Pat. 3,971,199 records that 30% of the 30,000 reports to the United States Public Health Service in 1973 for mower-related injuries were caused by objects thrown by the orbiting blade.

Many strimmers have the facility for replacing a metal cutter blade by a flexible nylon cord which is then used to trim vegetation adjacent walls and other solid surfaces which might damage the metal blade. A rotary cutting machine according to my invention can also have this facility, with the cord mounted instead of the cutter head and blade, or on the cutter head or blade, usually with the guard removed.

Thus I prefer to use a non-flexible cutter blade which may be of metal or a strong plastics material such as nylon which is however pivotally mounted to a cutter head. The histograms of FIG. 1 and FIG. 2 compare the thrown distances for equal weight test specimens which are injected into the path respectively of a propeller-type cutter blade and into the path of a pivotally-mounted cutter blade, the blades being of equal tip path diameter and being driven to orbit at the same speed; these histograms indicate clearly not only that the mean thrown distance is greater with the non-swivel blade but also that the maximum thrown distance is greater. The test conditions were then repeated for the non-swivel and swivel blades using test specimens of different weights, with the distance of the furthest-thrown specimen in each test being taken as the hazard distance (radius) for that specimen weight; the hazard zone (area) whilst being in the ratio of 2.1 to 1 for the respective 12 gram test specimens thrown furthest, increased to 3.0 to 1 for the 31 gram specimens thrown furthest, and to 8.5 to 1 for the 47 gram specimens thrown furthest. Thus pivotally-mounted cutter blades, such as those already known from U.S. Pat. 3,815,234, offer a considerable safety improvement for bystanders; U.S. Pat. 3,815,234 also discloses the provision of an abutment to limit the permitted pivoting movement of the cutter blade relative to the cutter head. Use of a pivotal blade is also advantageous in that it can prolong the life of the drive means since the drive means is not subject to the same degree of reaction impact loading. However the arrangement I propose has significant improvements over that of U.S. Pat. 3,815,234. For instance, my cutter blade is mounted on the cutter head by a bush which is wider than the cutter blade so that the blade can vibrate free in use or be levered free when stationary out of contact with the cutter head, so encouraging pivotal movement even in the presence of grass or dirt between the cutter head and cutter blade. The cutter blade is overlain by a retaining member, such as a washer, which acts to limit movement of the cutter blade away from the plane of the cutter head, I provide retention means to retain the cutter blade should the pivot fracture, and adapted to retain the cutter blade at least until the drive to the cutter head can be stopped or disengaged. The cutter head and the cutter blade retention means can be inter-engaged without first requiring the cutter head to be dismantled. Furthermore the retention means is designed to give adequate warning to the operator of pivot failure. Preferably the retention means is so designed that the cutter blade is planar, having a first opening to locate on a pivot carried by the cutter head, and an arcuate slot normally out of engagement with a retention tongue carried by the cutter head, the tongue being positioned so as to protrude through the slot, the tongue and one wall of the slot forming the said retention means, with an abutment to limit pivoting movement of the cutter blade to prevent engagement of an end of the slot with the tongue so as to prevent premature impact fracture of the tongue and the consequential loss of the retention means, which may not be noticed by the operator. Part of the slot is between the cutter blade pivot and the cutter head axis.

DISCLOSURE OF THE INVENTION

Thus according to one feature of my invention I provide a cutter blade assembly for a rotatable cutting machine including a cutter head having a rotational axis, a cutter blade carried by the cutter head and having a cutting surface, a pivotal mounting for the cutter blade on the cutter head positioned so that the cutting surface on the cutter blade can be pivoted outwards clear of the cutter head under centrifugal force during orbiting of the blade with the head, and retention means oh the cutter head engageable under said centrifugal force by the cutter blade on loss of said pivotal mounting characterised in that the cutter blade can be replaced on the cutter head without dismantling the cutter head. According to a further feature of my invention I provide a cutter blade assembly for a rotary cutting machine comprising a cutter head rotatable about an axis, a cutter blade having a cutting surface, a pivotal mounting for the cutter blade on the cutter head positioned so that the cutting surface on the cutter blade can be pivoted outwards clear of the cutter head under centrifugal force during orbiting of the blade with the head, and retention means on the cutter head engageable under said centrifugal force by the cutter blade upon loss of said pivotal mounting characterised in that the retention means is a tongue engageable with an edge of a slot, the cutter head including one of the tongue and slot and the cutter blade the other of the tongue and slot.

Preferably the retention means on the cutter head is a tongue upstanding from the cutter head, the cutter blade having an arcuate slot centred at the pivotal mounting, the tongue extending into the slot; and with abutment means are provided to limit the Permitted pivotal movement of the cutter blade to prevent engagement of the tongue by an end of the slot during said pivotal movement.

Whilst a cutting machine can be used on various types of vegetation, one typical requirement is for cutting moisture-filled grass in the spring, and fibrous grass in the autumn. Replaceable cutter blades have already been proposed, such as in U.S. Pat. No. 3,320,733. However I prefer a blade for which the cutting characteristics can be changed without need for the blade to be removed from the machine.

Thus according to yet another feature of my invention I provide a cutter head assembly for a rotary cutting machine which includes a cutter head rotatable about a drive axis and a cutter blade pivotally mounted on the cutter head characterised by weight means removably mounted on the cutter blade to permit adjustment of the moment arm of the cutter blade. I thus propose to adjust the weight and/or the weight distibution of the cutter blade to suit the vegetation to be cut. Preferably the cutter blade has one or more apertures in which a weight can be selectively positioned, so that for instance for cutting fibrous grass I can use a heavier blade or one with its centre of gravity further from the rotational axis. My arrangement has the advantage with a swivel blade that the characteristics of the pivotally-mounted blade can be adjusted without need to remove the blade. It has the further advantage that the cutter head assembly may not need to be driven at so high a rotational speed to cut fibrous vegetation as assemblies without this feature.

In an alternative embodiment I can provide a replaceable cutter surface, and this cutter surface may be variously weighted. Thus according to yet a further feature of my invention I provide a blade assembly for a rotary cutting machine having a cutter head, drive means for the cutter head, and a cutter blade pivotally mounted on the cutter head characterised in that the cutter blade has a replaceable cutting surface.

As an alternative feature I provide a blade assembly for a rotary cutting machine having a base member rotatable about a drive axis, a cutter blade having a cutting surface, and means to mount the cutter blade removably on the cutting surface, said means including a pair of upstanding axially- spaced elements, one of said elements engaging a first edge of the cutter blade opposed to the cutting surface and the other of said elements abutting a second edge of the cutter blade opposed to the first edge but axially spaced from the cutting surface characterised in that the cutter blade includes at least one re-entrant notched portion adapted to embrace said one of said elements to hold the cutter blade against centrifugal force during rotation. An advantage of my arrangement is that the cutter blade or tip can be replaced principally radially-inwardly without interfering with the base member or its mounting.

There have been a number of official studies of the problem of stones and other loose objects which lie in the path of a cutter blade being impacted and thrown clear of the machine to the danger of bystanders and of the operator. Thus a United States study in 1974 on the injury-producing potential of various kinds of thrown objects and detailed in Attachment 2, Page 7, to the U.S. Consumer Product Safety Commission Report of June 1976, indicated that small, hard, pointed objects such as wire and glass shards are the objects principally involved in the majority of thrown- object injuries "probably because wire travelling at high speeds can easily penetrate human flesh and bones. On several occasions, such penetration struck a vital organ causing death. Thus a Revised Standard for the thrown-objects test has been adopted wherein a test surface covered with artificial turf is surrounded by a target in the shape of an octagonal wall; while the mower is operating, 300 nails are injected upwards into the blade from six injection points, each located 2.54 cm. inside the blade tip circle and flush with the test surface. The number and location of the target hits by the nails determine if the machine meets the Standard, nails hitting the operator zone being more heavily penalised. This Standard was set, notwithstanding that of the numerous machines available for test only one met the revised Standard; and since cutting efficiency is not a part of the revised Standard, there is no indication that this one machine was effective at cutting vegetation. After lengthy experimentation, have concluded that in order to meet the revised U.S. test for thrown-objects without significant loss of cutting efficiency, the cutter guard needs to include a plurality of guard elements mounted in cantilever to form part of the guard roof and of that skirt portion guiding the grass towards the cutter blades; at least 160 degrees of the skirt in the operator zone should however for operator protection be solid, that is unapertured, though this angle can usefully be increased to say 200 degrees for wheel-mounted mowers moving only directly forwards. As compared therefore to the proposal of U.S. Pat. 4,069,651 my skirt portion in the operator zone is not apertured, and as compared to the proposal of Canadian patent 984,602 my guard elements are cantilevered and so able both to block and to flex when hit by a blade-impacted object. Clearly a guard having spaced guard elements is not suitable for use with an airlift rotary cutting machine. When testing my guard with a shoulder-mounted strimmer, set the height of the blade above the test surface at 5.08 cm (2") since this is the height specified in the A.N.S.I. (American National Standards institute) test procedure. The Revised Standard is generally directed to penalising widespread dispersion of the test objects and does not specify one blade height but merely requires the blade to be at the maximum height available for that machine. A greater height is not representative of normal vegetation cutting length; whilst a smaller height means that many test objects are hit before they are clear of the test surface and so are not properly impacted, giving apparently good but spurious test results.

According to an advantageous feature of my invention therefore I provide a guard for a cutter blade in a non-airlift rotary cutting machine comprising a roof and a skirt, the skirt having a first section with circumferentially spaced openings and a second imperforate section without said circumferentially spaced openings which is to say, the second section is substantially imperforate characterised by a plurality of guard elements each comprising a leg and a finger, the legs providing part of the rock and the fingers the said first section each leg having a vertical dimension sufficiently greater than its circumferential dimension to define an enlarged part providing, with its depending finger, an obstruction to objects propelled substantially tangentially by a blade. Each guard element preferably has a circumferential width less than the spacing between adjacent fingers. Usefully the guard elements are formed in pairs, and with a resilient snap-fit catch or hook. The adjacent fingers are preferably spaced such that a tangent to the blade tip path passing between said fingers traverses two fingers. In order to limit the number of times an impacted object trapped within the skirt is hit by the orbiting cutter blade, intermediate its circumferentially spaced ends the second section is preferably radially outwards of the blade tip path by at least 2cm. The guard elements may be planar so as to provide a generally rectangular obstruction to impacted objects. Preferably the two elements adjacent that end of the second section first met as a blade enters the second section have legs and fingers with a greater dimension i.e. upwardly, downwardly and outwardly, than those of the remaining elements. Conveniently my guard is assembled from modular parts and such a modular arrangement has the advantage as above that the pairs of guard elements do not have to be identical, and that the parts can be individually replaced; suitably my guard comprises three differently designed pairs of guard elements; as mentioned above the two guard elements immediately adjacent that one end of the skirt in the operator zone first met by the orbiting cutter blade have dimensions larger than standard; and the two guard elements at the other end of the skirt of the operator zone, that is those last left by the orbiting cutter blade, usefully have their radial extremities on a chord joining the adjacent guard element to the skirt so as to provide a straight guard edge suitable for instance for cutting along a wall. For this last mentioned pair of guard elements, so as to ensure an adequate size of guard element and particularly of the depending finger defining the relevant portion of the first skirt section, the guard elements have curved legs and have their extremities angled away from the operator zone skirt, this orientation having the advantage of helping to guide the vegetation to be cut into the machine as the operator moves the machine forwards along the wall.

Objects impacted by a cutter blade can still escape from my guard, but with a reduced kinetic energy. Since my tests have shown that impacted objects within the operator zone skirt may be hit more than once before being thrown clear, I prefer both a minimum radial clearance between my blade tip and the inside wall of the skirt of at least 2 cm, and to provide an inward protruberance on the operator zone skirt at that end last left by the orbiting cutter blade.

Thus according to a yet further feature of my invention I provide a rotary cutting machine comprising a rotatable cutter head, drive means for the cutter head, a cutter blade pivotally mounted on the cutter head such that a cutting surface on the blade projects radially outwards beyond the cutter head, means on said cutter head spaced from said pivotal mounting position and engageable by the cutter blade to prevent the cutter blade disconnecting from the cutter head in use, and guard means including a skirt within which said cutter blade rotates.

BRIEF DESCRIPTION OF THE DRAWINGS

FIG. 3 is a sectional side view of a strimmer rotary machine, with swivel cutter blades and modular guard;

FIG. 3A is an enlarged view of an alternative guard mounting to that shown in FIG. 3;

FIG. 4 is an enlarged detailed view of the pivotal mounting for a swivel blade;

FIG. 5 is a plan view of a cutter head-cutter blade pivotal mounting, but with the nut 42, spring washer 40 and washer 38 of FIG. 4 removed;

FIG. 6 is a plan view of a replacable cutter tip, on base member 66;

FIG. 7 is a sectional view of an alternative embodiment of replaceable cutter tip having a retaining stud, taken along the line V11—V11 of FIG. 6;

FIG. 8 is of the rear guard section;

FIG. 9 is of the front guard section, shown in relation to the circumferentially spaced ends of the rear guard section;

MODES FOR CARRYING OUT THE INVENTION

Figure 1:
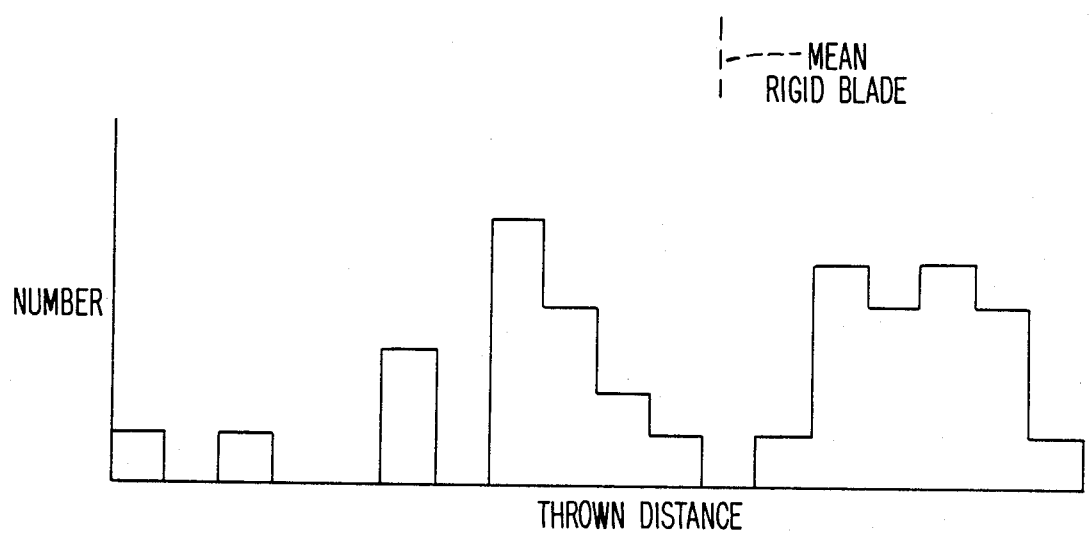
FIG. 1 is a histogram recording the thrown distance for test objects with a conventional propeller-type blade.
Figure 2:
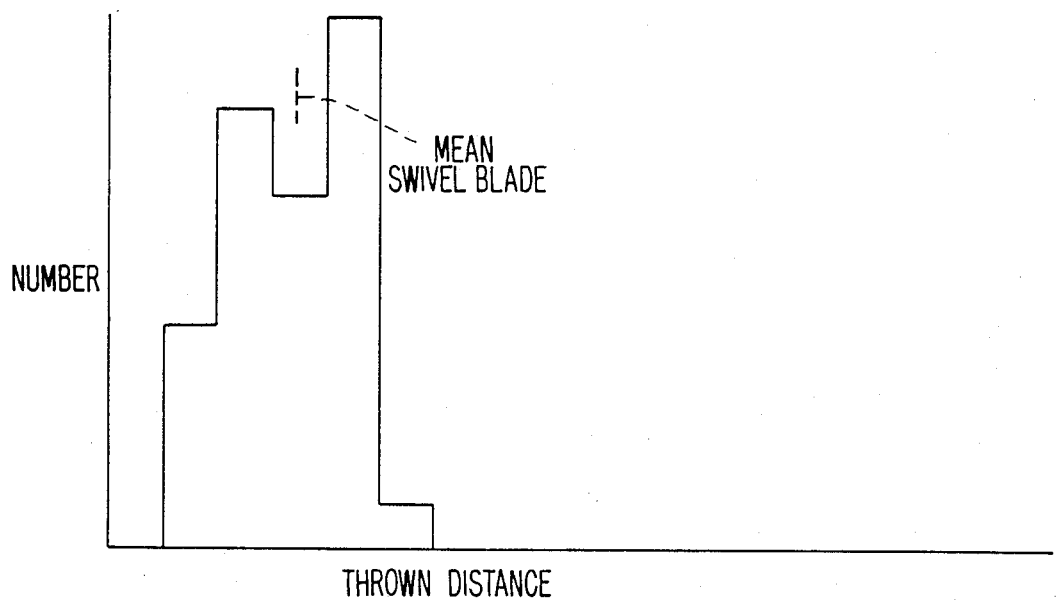
FIG. 2 is a histogram repeated as for FIG. 1 but with a swivel blade.

The rotary mowing machine as seen in FIG. 3 comprises a housing part 2, cutter blade assembly 4 and cutter guard 6. The housing part 2 in this embodiment has a coupling (not shown) for a shoulder strap, so that the machine is a manually supported strimmer, but in alternative embodiments the housing part 2 could be mounted on wheels or skids. My improved cutter blade assembly can also be used with airlift machines supported on an air cushion, created for instance by the orbiting cutter blade.

Housing part 2 comprises a hollow tube 10 containing a shaft 12 rotatably driven by a prime mover (not shown) such as a petrol engine or electric motor. Shaft 12 is coupled via gearing 14 to drive shaft 16, supported for rotation in housing part 2 by ball-race 18. Drive shaft 16 carries a locating bush 20 rotatable with drive shaft 16, and a washer 22, and has a threaded end 24 for nut 26; in this embodiment the cutter blade assembly is positioned between a shoulder on locating bush 20 and washer 22, and can be removed as a sub-assembly after unscrewing nut 26.

In the embodiment of FIG. 3, the guard 6 is carried by annular support 200 integral with the housing part 2; but in an alternative embodiment as seen in FIG. 3A, the support 200 is detachably secured to the housing part 2, as by screws 201.

The cutter blade assembly 4 comprises a cutter head 30 and a pair of cutter blades 32 pivotally mounted thereon. When orbiting about drive shaft 16 the cutter blades 32 extend radially beyond the cutter head 30 under centrifugal force. The cutter blades 32 are pivoted on the cutter head 30 in balanced configuration; in this embodiment two cutter blades 32 are mounted at diametrically opposed positions, but in alternative embodiments three or more blades could be utilised.

The pivotal mounting is shown more clearly in the detailed view of FIG. 4. Pivot bush 34 is located on bolt 36 between cutter head 30 and a washer 38, pivot bush 34 being inhibited against rotation by spring washer 40 backed by nut 42. Pivot bush 34 permits the respective cutter blade 32 to swivel relative to the cutter head 30, for instance if a loose object is impacted by the cutter blade 32 during orbiting about drive shaft 16; each pivot bush 34 has a greater depth than the thickness of cutter blades 32, so allowing them to shake clear of any accumulated grass or dirt, or of rust if one or more of the cutter head 30, cutter blade 32 and washer 38 is of ferrous material and the machine has for instance been stored over-winter. Washer 38 has a further purpose to be described below.

Each cutter blade 32 has a surface 44 which engages ear 46 upstanding from cutter head 30 to limit the permitted pivotal movement, for instance to 90 degrees or thereabouts; in an alternative embodiment, as shown in FIG. 3, bush 20 acts also as this abutment means. Furthermore, when one or more of the cutter blades 32 are so pivoted the surface 44, being an arc of a circle having a centre radially outwards of pivot bush 34, exposes one or other of chambers 48 punched downwardly from cutter head 30 and into which, during use, debris accumulating between cutter head 30 and the respective cutter blade 32 can be swept by the blade; thus with the blades pivoted to this limit position and with the drive stopped, the debris can be cleaned out from a chamber 48. Each chamber 48 has a solid bottom to prevent sand or gravel entering from below, during use of the rotary cutting machine, into the space between the cutter head 30 and the cutter blades 32.

Each cutter blade 32 is planar, and includes an arcuate slot 50 with its centre at the axis of pivot bush 34. Upstanding from cutter head 30 is a tongue 52, in this embodiment being punched out of the cutter head 30; but in one alternative embodiment the tongue is a metal strip welded to the cutter head 30; and in another embodiment the tongue is formed y the shank of a bolt mounted in the cutter head. In normal use, the side edges 54 of arcuate slot 50 are spaced from the tongue 52, and the end edges 56 are also spaced from tongue 52 when surface 44 engages upstanding ears 46 to limit the permitted pivotal movement of the blade; thus tongue 52 is not subject to either wear or impact loads, which could cause it to shear or fracture, unknown to the machine operator. If in use the pivotal connection between the cutter head 30 and a cutter blade 32 should fail, the cutter blade will tend to fly radially outwards under centrifugal force until arrested by engagement of side edge 54 with tongue 52. Because the arcuate slot 50 is radially inwards of the axis of pivot bush 34, the engagement of the tongue with a side edge 54 at any position away from that intersected in FIG. 5 by reference line 58 will provide a noticeable offset loading to warn the operator, and give time for the prime mover to be switched off or disconnected. Additional advantages of my arrangement are that both the cutter head and cutter blade are of simple construction and that the cutter blade can be replaced, if desired, merely by disconnecting the pivot, without need to disassemble the cutter head. e.g., if filtered with cutter tip 64 (FIG. 6);

In an alternative embodiment (not shown), the tongue can be on the cutter blade, and the slot in the cutter head.

The washer 3B overlies arcuate slot 50 to inhibit grass and dirt from lodging between the head 30 and blades 32. Washer 38 has an aperture 39 to receive tongue 52 and so can act as an additional retention means for blade 32 in case the pivot should shear or otherwise fail.

The cutter blades 32 have apertures 60 in which weight means (not shown) can beselectively positioned, so that the moment arm of cutter blades 32 can be changed to suit the cutting conditions. When weighted, the prime mover does not need to be driven at the higher speed normally needed to cut fibrous vegetation; conversely, a weighted blade will not improve the cutting effectiveness if the vegetation e.g. grass, is succulent, but will increase the thrown distance and hazard zone for objects impacted, so that the weight(s) then need to be removed.

In an alternative embodiment, the cutter blade assembly 4 may include replaceable cutter tip 64. Thus, as seen in FIG. 6, punched out of base plate 66 are two oppositely directed cranked members 68, 70 having respective inwardly-facing upstanding edges 72,74, and overlying portions 76,78 to press and firmly secure the tip 64 to the base plate 66. The radially-outer cranked member 70 has its overlying portion 78 extending forewardly i.e. in the direction of orbiting in use; the overlying portion 76 of cranked member 68 extends rearwardly. Whilst generally rectangular, base plate 66 has edges 80, 82 forming a cut-out forewardly of cranked member 70, so as not to interfere with the action of cutting surface 84 of replaceable cutter tip 64.

The cutter tip 64 is intended to be reversible, and so has a second cutting surface 86.

The replaceable cutter tip 64 has a first end 88 joining side edges 90, 92 and a second end 94 joining side edges 96, 98; second end 94 is offset forewardly in the direction of orbiting relative to the first end 88. Side edges 90, 92 and 96, 98 are equally spaced apart, but are spaced less than upstanding facing edges 72, 74 so that a cutter tip 64 can be introduced by way of first end 88 between the upstanding facing edges 72, 74, preferably whilst in sliding contact with base plate 66.

Side edges 92, 98 and side edges 90, 96 are joined respectively by the re-entrant notched portions 100, 102 forming a pair of hooks axially spaced, but by less than the axial spacing between upstanding edges 72,74.

During orbiting, notched portion 102 embraces upstanding edge 74 which thus holds the cutter tip against centrifugal force and tangential movement; but when not orbiting, to replace the cutter tip 64 the notched portion 102 can be slid free from upstanding edge 74; since the tip 64 has only to be slid inwardly a short distance to be released from edge 74, the cutter tip 64 can be replaced without the need first to remove the base member 66 from the machine. In an alternative embodiment the cutter tip 64 and the overlying portion 78 can have aligned holes to receive a releasable retaining member 104 which may also act as a weighted means and be of any convenient form e.g. a nut and bolt, but as shown comprising a head 106 and flexible shank 108, for instance by having a pair of diametrically-opposed longitudinal slits (not shown). The head 106 is a separate means to stop movement of tip 64 relative to plate 66. It will be understood that in operation when cutting surface 84 is in use to cut vegetation, the direct loading from cutting surface 84 is distributed along cranked member 70, whilst cranked member 68 restrains pivoting of the cutter tip 64 under such loading. Base plate 66 can swivel about pivot 65.

In an alternative embodiment, the trailing edge 67 of the plate 66 is upturned (not shown) to create an air draft to direct e.g. grass clippings into a collecting bag (not shown).

The base plate 66 can in an alternative embodiment be a fixed propeller blade.

The guard 6 is of modular construction, having a rear guard section 110 (FIG. 3), and a front guard section 112 comprising guard elements 114, 116, 118 (FIG. 9).

Rear guard section 110 has an imperforate skirt 122 (FIG. 3) subtending 160 degrees at the drive shaft 16. In this embodiment, the rear skirt extends 3.5 cm below the plane of cutter blades 32, whilst the roof 124 of the rear guard section 110 is 0.8 cm above the blade plane. It is recommended that strimmers be held at a slight angle to the transverse ground line for side to side cutting, so that when viewed from in front or behind one side is alternately lower than the other; to assist cutting when so sideways tilted the rear guard section 110 has chamfered skirt end portions 126, to permit the blade tip to approach closer to the ground so that effective cutting is not impeded by the fuller depth skirt 1 propose.

Figure 8A:
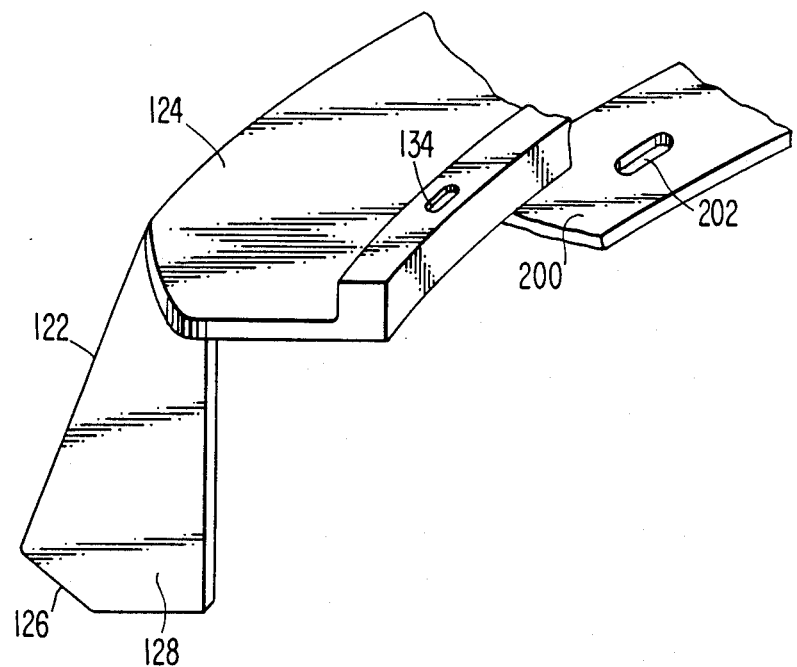
FIG. 8A is an enlarged cut-away view of the rear guard blade exit end.

Whilst most impacted loose objects are projected perpendicularly to the cutting edge of a blade, my tests have shown that some test objects are impacted at least twice, and emerge from the rear guard section 110 at unexpected angles. To limit the occurrence of multiple-strikes within the rear guard section 110, between its circumferential ends I provide a gap of 2.5 cm between the cutter blade tip and the skirt 122; further, with a cutter blade orbiting in the direction shown by arrow 130 of FIG. 8, and as best seen in FIG. 8A, the end 128 of skirt 122 last-left by the cutter blade is angled inwardly, so as to intercept loose objects ricocheting around the inside of the skirt. Thus with a skirt of diameter 18 cm the end 128 has an inner diameter of 16.5 cm with a blade tip clearance of 1.0 cm.

Figure 8B:
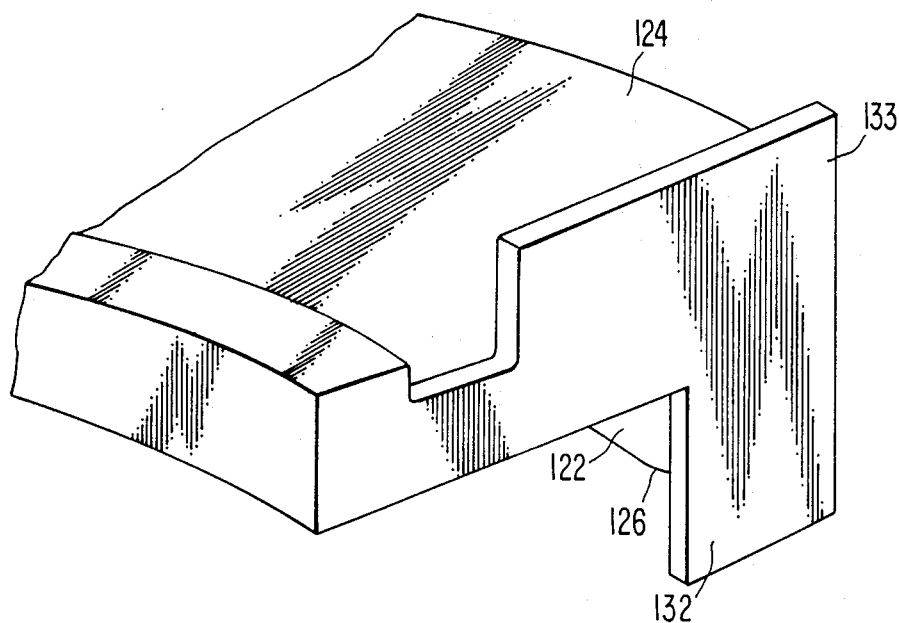
FIG. 8B is an enlarged cut-away view of the rear guard blade entrance end.

In contrast, and as best seen in FIG. 8B, end 132 is angled outwardly, to a radius of 20.0 cm, and it has upstanding face 133 extending 1.5 cm above the adjacent guard roof 124, so that end 132 of rear guard section 110 presents an obstruction to impacted objects projected towards the operator zone. Thus loose objects propelled towards the operator zone can be better intercepted by the end 132 of the rear guard section including face 133.

The rear guard section has three mounting holes 134, which receive screws 136 (FIG. 3) for detachably securing the rear cover section to the housing part 2; or for the embodiment of FIG. 3A removeably to the support 200. The roof 124 is solid; but in an alternative embodiment can have openings to lighten rear guard section 110.

As best seen in FIG. 9, the front guard section 112 comprises a plurality of guard elements 114, 116, 118 made in pairs so that if an element is damaged the whole front guard section does not have to be replaced. The elements are mounted in cantilever on housing part 2, resiliently locating under hoops 140, 142 formed as integral rings with housing part 2, and retained by hook 143; though in an alternative embodiment the hoops can be separate and individually welded to the housing part 2.

Figure 10:
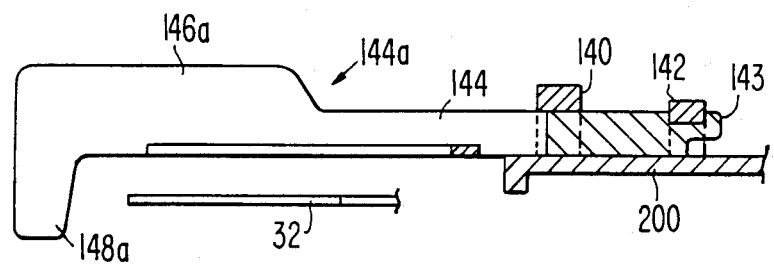
FIG. 10 is of a first front section guard element.

The guard elements 114 (see FIG. 3, FIG. 9 and FIG. 10) each comprise a radial leg 144a with an enlarged part 146a of radial length 6.0 cm and of vertical dimension 2.0 cm; and a depending finger 148a extending 0.3 cm below the plane of the cutter blade 32. The radial length of the finger 148a at the root is 1.5 cm and at the lower edge is 1.0 cm, and the radial spacing between the blade tip circle and this lower finger edge is 1.5 cm.

Figure 11:
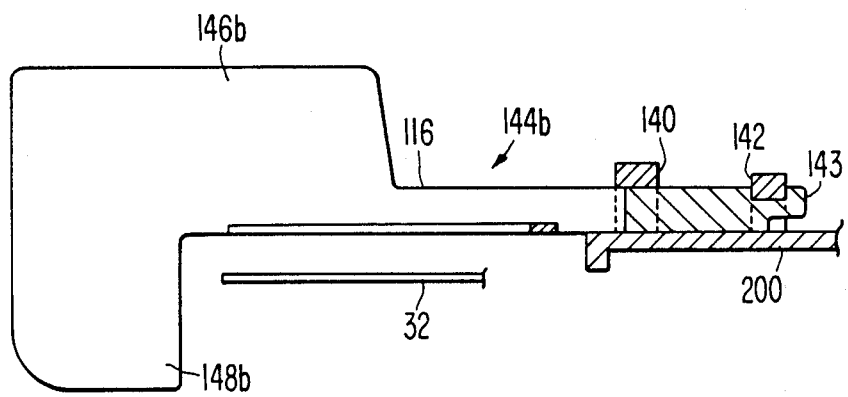
FIG. 11 is of a second front section guard element.
Figure 12:
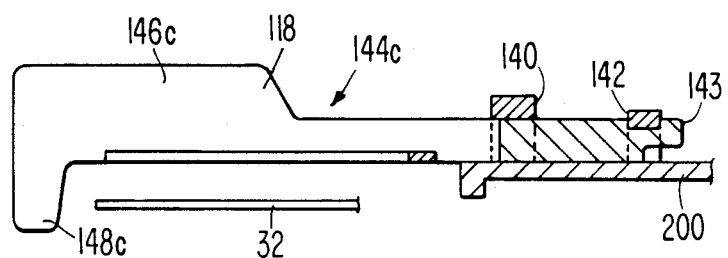
FIG. 12 is of a third front section guard element.

The guard elements 116 (FIG. 9, FIG. 11) adjacent end 132 of the rear guard section have the same outer radius (20 cm) as the end 132. The radial length of the enlarged part 146b is therefore 8.0 cm; its vertical dimension is increased to 3.5 cm, whilst keeping its spacing from the cutter blade plane at 0.8 cm. The radial length of the finger 148b at the root and at its lower edge is 3.5 cm, so that the finger 148b is generally rectangular; with the radial spacing between the blade tip circle and the lower finger edge being reduced to 1.0 cm. The lower finger edge extends 3.0 cm below the plane of the cutter blade 32. Thus the two guard elements 116 present a larger obstruction to loose flying objects than do the guard elements 114, guard elements 116 being however is a direct line between the cutter blades 32 and the operator zone.

Figure 13:
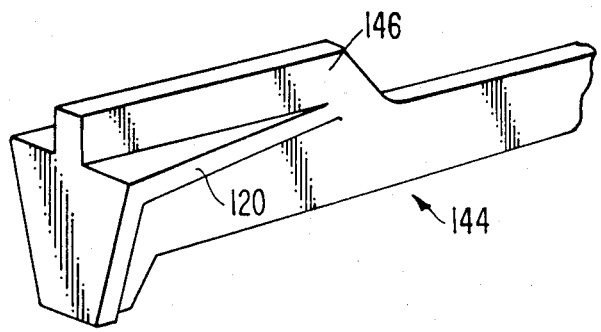
FIG. 13 is of a modified guard element, with triangular wings at the legs and fingers.

The legs 144c of the two guard elements 118 extend to the hypothetical line 145 joining the end 128 of the rear guard section and the first adjacent guard element 114, so that the radial extremities of the two guard elements 118 and of the first adjacent guard element 114 form a straight edge, useful for cutting along walls and the like. The legs 144c are angled, so that as the rotary cutting machine is moved forwards, the vegetation along the wall to be cut is guided towards the orbiting cutter blades 32. Because the legs 144c are angled, the radial spacing between the blade tip circle and the lower finger edge is reduced as for the guard elements 116, but except as already specified the dimensions of guard elements 118 correspond to those of guard elements 114. For extra strength the guard elements 118 can be formed as shown in FIG. 13 (described below)

In order that chord 145 will be closer to the tip of cutter blade 32 for a closer "wall" trim, end 128 has a reduced radius-in this embodiment of 17.0 cm.

In an alternative embodiment (not shown) the guard elements 118 can be of significantly different length, that element furthest in use from the end 128 being longer and curved away from end 128 so as to more readily guide grass etc into the path of the cutter blades. Chord 145 from end 128 usefully will "touch" the tip of that element (but not an element 114). The other element 118 of the pair can be curved or planar as convenient.

As is clear drawings and the dimensions set forth above, each leg has a vertical dimension sufficiently greater than its circumferential dimension to, define an enlarged part 146a, 146b, 146c, providing an obstruction to objects propelled substantially tangentially by a blade.

It will be seen from FIG. 9 that each guard element has a circumferential width less than the spacing between adjacent fingers; and that to escape from between adjacent fingers a loose object propelled tangentially to the blade tip circle has to traverse at least two legs 144, and if propelled from a position radially inwards of the tip circle has to traverse up to five legs 144. The spacing between adjacent fingers 148 should not exceed 5.0 cm. Thus whilst impacted objects can escape from the guard, they do so with reduced kinetic energy upon having contacted for instance either one or more enlarged portions 146, or depending fingers 148, or both. As an additional safety feature, my unapertured skirt 122 of my rear guard section extends below the rotational plane of cutter blades 32 by more than the fingers 148 so extend (see FIG. 3), which inhibits projecting missiles bouncing below the skirt 122 and rebounding to hit the operator whilst yet allowing the strimmer to be tilted forwards for effective cutting of that vegetation guided between the guard elements 114.

The fingers 148 form a first skirt section which in use is to the front and sides of the machine; whilst the skirt 122 is an unapertured second section or at least a section having apertures too small to permit objects large enough or heavy enough to harm the operator to pass through unimpeded. Legs 144 form the part of the guard roof associated with fingers 148, whilst the remainder of the roof 124 is associated with skirt 122.

In an alternative embodiment, for greater strength and also to reduce the circumferential spacing between the adjacent fingers, one or more of the guard elements 114, 116, 118, can have wings 120 (FIG. 13), preferably triangular.

For occasional use as a e.g. nylon cord strimmer, the front guards 114, 116, 118 can be removed so as not to obstruct the cutting action of the nylon cord; the rear guard section 110 will be left in place.

The guard, and particularly each guard element 114, 116, 118, is preferably of a shatterproof, resilient, lightweight material such as nylon or a polycarbonate. The guards are attached to an annular support disc 200. Disc 200 has mounting slots 202 through which can be passed retaining screws. Slots 202 permit a limited rotational adjustment of the guard elements and rear guard section 110 in relation to the housing 2 to provide better protection for the operator zone. In an alternative embodiment (not shown) disc 200 and rear guard section 110 can be formed as an integral unit.

I have thus proposed a rotary cutting machine fitted with a non-flexible propeller or swivel cutter blade and a guard having a front and rear sections, the front section comprising cantilevered guard elements and the rear section a full deep skirt. Stray objects impacted at or above the maximum designed cutting load of the pivotal cutter blade will be projected with less speed than by a rigid propeller type cutter blade of the same mass and rotational velocity, so causing less damage to the guard. But because the impact loading on the pivotal cutter blade is less, the cutter blade being able to yield, there is a reduced shock loading and reduced stress loading of the rotary cutting machine components so that there is likely to be a reduced maintenance requirement, fewer repairs and less frequent machine replacement. Because the cutter blades are able to yield they will be slower to become blunted and will be substantially less prone to fractures. Nevertheless I have proposed a replaceable cutter tip, which can be used both on swivel blades and conventional propeller type blades; means to vary the moment arm of a swivel cutter blade including the differentially-weighted replaceable tip portion type; a cutter blade assembly incorporating a cutter head and a swivel blade in which the swivel blade can be replaced without need to disassemble the head; a cutter blade assembly including a cutter head and a swivel blade in which separate retention means are provided to hold the blade against itself becoming a flying object under centrifugal force, the retention means being designed so that the operator is clearly made aware of any failure of the pivot; and guard means, which whilst being both light in weight and convenient to fix and remove, yet allows the operator whether private or commercial to cut vegetation effectively whilst improving his and bystander safety to more than the Standard currently set by the American authorities. It will be understood that the dimensions indicated can be changed to alter the balance between safety and cutting efficiency; a shorter blade with a "standard" guard will give an improved safety test result but at the expense of cutting efficiency. It will also be understood that spacers (not shown) can be inserted between ball race 18 (FIG. 3) and bush 18 to change the blade height for a different cutting height.

I claim:

1. A cutter blade assembly for a rotary cutting machine comprising a cutter head rotatable about an axis, a cutter blade having a cutting surface, a pivotal mounting for the cutter blade on the cutter head, the pivotal mounting being positioned so the cutting surface of the cutter blade can be pivotal outwards clear of the cutter head under centrifugal force during orbiting of the blade with the head, and retention means for the cutter blade operatively engageable with a slot, the slot having a pair of opposed ends joined by side edges the retention means being operatively disengaged during said orbiting from said opposed ends and side edges until loss of said pivotal mounting the retention means being an upstanding projection engageable upon said loss of the pivotal mounting with a side edge of the slot, the cutter head including one of the projection and slot and the cutter blade including the other of the projection and slot.

2. A cutter blade assembly according to claim 1 wherein the slot is arcuate with its radial center at the pivotal mounting, parts of the slot being to either side of a hypothetical straight line passing through the pivotal mounting and said axis, a part of the slot being between the pivotal mounting and said axis, the retention means during use being out of contact with the said ends and side edges defining the slot while said pivotal mounting is present.

3. A cutter blade assembly according to claim 1 which includes abutment means for preventing engagement of the projection with either opposed end of the slot.

4. A cutter blade assembly according to claim 3 which includes a first curved engagement surface carried by the cutter head, and a second curved engagement surface on the cutter blade, said first engagement surface being contactable by second engagement surface to form said abutment means, said first and second engagement surfaces being arranged to provide a progressive arrestment of inward pivoting of the cutter blade.

5. A cutter blade assembly for a rotary cutting machine comprising a cutter head rotatable abut an axis, a cutter blade having a cutting surface, a pivotal mounting for the cutter blade on the cutter head, the pivotal mounting being positioned so that during orbiting of the blade upon rotation of the cutter head the blade can pivot outwardly under centrifugal force until its cutting surface is clear of the cutter head and can also pivot inwardly, abutment means to limit inward pivoting of the cutter blade, and retention means for the cutter blade operatively engageable to retain said cutter blade coupled to said cutter head even under said centrifugal force, the retention means being operatively engagable only upon loss of the pivotal mounting, the retention means being spaced from the abutment means, an upstanding projection defining the retention means and being operativley engagable with an edge of a slot, the cutter head including one of the projection and slot and the cutter blade including the other of the projection and slot.

6. A cutter blade assembly for a rotary cutting machine as claimed in claim 5 wherein the abutment means includes a non-linear surface engageable with a non-linear surface on the cutter blade whereby the cutter blade is first restrained against inward movement and thereafter prevented from further inward movement.

7. A cutter blade assembly for a rotary cutting machine as claimed in claim 5 which includes a pair of cutter blades each having a cutting surface, a first pivotal mounting on the cutter head for one of the cutter blades, a second pivotal mounting on the cutter head for the other of the cutter blades, each of the pair of pivotal mountings being positioned so that during rotation of the cutter head about the axis each blade is adapted to pivot outwardly until its cutting surface is clear of the cutting head, the said pivotal mountings being on a common radius from said axis and at diametrically opposed positions to either side of the axis.

8. A cutter blade assembly for a rotary cutting machine as claimed in claim 5 in which the upstanding projection is integral with the cutter head, and in which the slot is in the cutter blade, the cutter blade being substantially flat.

* * * * *